Jan. 13, 1925.

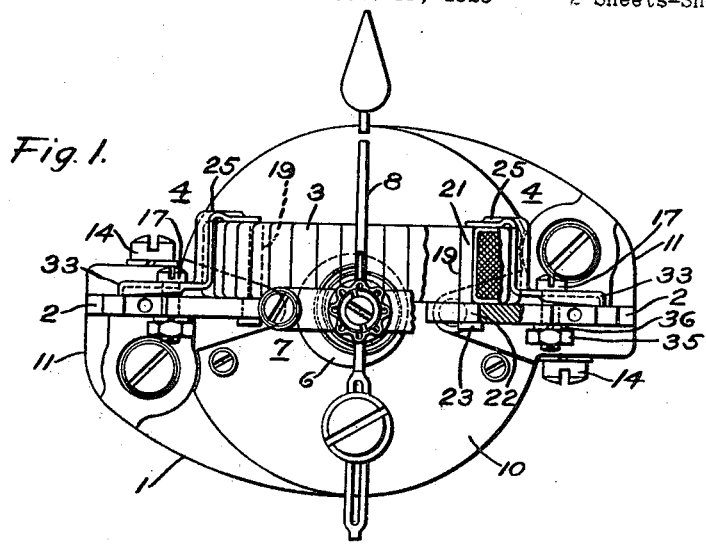

P. MacGAHAN ET AL 1,522,736

ELECTRICAL MEASURING INSTRUMENT

Filed Oct. 11, 1923  2 Sheets-Sheet 2

WITNESSES:

INVENTORS
Paul MacGahan &
Raymond T. Pierce.
BY
ATTORNEY

Patented Jan. 13, 1925.

1,522,736

UNITED STATES PATENT OFFICE.

PAUL MacGAHAN, OF PITTSBURGH, AND RAYMOND T. PIERCE, OF EAST PITTSBURGH, PENNSYLVANIA, ASSIGNORS TO WESTINGHOUSE ELECTRIC & MANUFACTURING COMPANY, A CORPORATION OF PENNSYLVANIA.

ELECTRICAL MEASURING INSTRUMENT.

Application filed October 11, 1923. Serial No. 667,856.

*To all whom it may concern:*

Be it known that we, PAUL MacGAHAN, a citizen of the United States, and a resident of Pittsburgh, in the county of Allegheny and State of Pennsylvania, and RAYMOND T. PIERCE, a citizen of the United States, and a resident of East Pittsburgh, in the county of Allegheny and State of Pennsylvania, have invented a new and useful Improvement in Electrical Measuring Instruments, of which the following is a specification.

Our invention relates to electrical measuring instruments and particularly to coil-supporting means therefor.

One object of our invention is to provide a device of the above indicated character that shall be neat in appearance, simple, compact and durable in construction, economical to manufacture and effective in its operation.

Another object of our invention is to provide a coil-supporting means for an electrical measuring instrument that shall facilitate the assembly thereof.

Another object of our invention is to provide a coil-supporting means that shall permit adjustment of the instrument parts.

A further object of our invention is to provide a clamping means for an instrument coil that shall securely hold the coil in position and compensate for shocks, jars and temperature changes.

Figure 4:
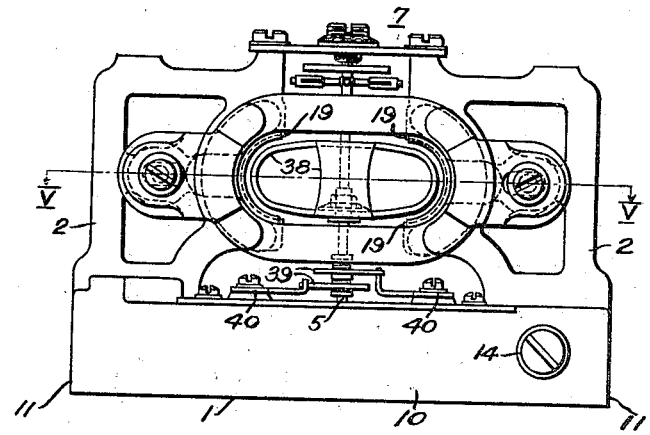
Figure 5:
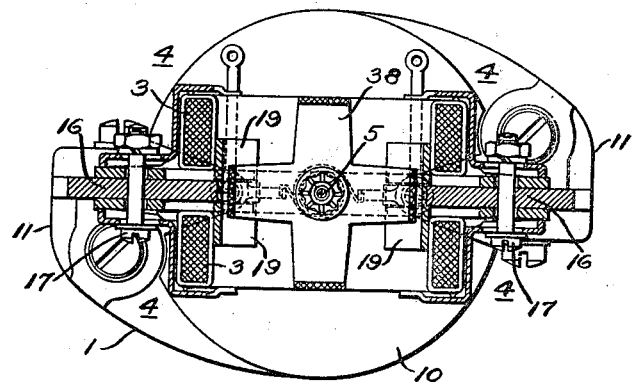

Fig. 1 of the accompanying drawings is a plan view of an electrical measuring instrument embodying our invention, Fig. 2 is a side elevational view of the device shown in Fig. 1, Fig. 3 is a detailed view of one of the elements shown in the other figures, Fig. 4 is a view, similar to Fig. 2, of a modified form of our invention, and Fig. 5 is a sectional view taken along the line V—V of Fig. 4.

An instrument constructed in accordance with our invention comprises, in general, a base member 1, a pair of standards or brackets 2, a coil 3, supporting devices 4 for the coil 3, a shaft 5, an armature 6, a bridge structure 7 extending between the brackets 2, and a pointer 8.

The base member 1, preferably constructed of molded insulating material, comprises a main portion 10 of substantially cylindrical box-like construction to provide an air damping chamber for the shaft 5 and diametrically opposite projecting portions 11 for the support of the standards 2. The portions 11 are provided with slots for the reception of lugs 12 on the standards 2 and lateral screw holes for the reception of screws 14 which hold the brackets 2 in position.

The brackets 2 are preferably of substantially flat sheet construction lying in a plane normal to the base member 1, on opposite sides of the shaft 5, and are provided with portions 16 for the reception of screws or bolts 17, for a purpose to be hereinafter set forth.

The coil 3 is preferably constructed to be of substantially elongated oval shape, having its major axis lying parallel to the base member 1, and is adapted to be disposed with its side surface, adjacent to its ends, against the sides of the standards 2. This construction places the shaft 5 at one side of the coil 3 and adapts the armature 6, which is eccentrically mounted on the shaft 5, to be drawn into the opening in the coil to move the pointer 8.

Laterally projecting portions or members 19, on the standards 2, are of preferably semi-cylindrical shape, having portions 21, 22 and 23 of different radii. The portion 21 is of substantially the same radius as the inner radius of the end of the coil 3, the portion 22 fits a receiving portion on the bracket 2 and the portion 23 constitutes a flange by which the member 19 is prevented from movement out of the bracket in the direction of the coil 3. The above construction mounts the coil similar to the manner in which a skein of yarn is wound on oppositely disposed pins.

Members 25, a detailed view of one of which is shown in Fig. 3, each comprising a portion 26 for disposition substantially parallel to one side of one of the standards 2, a portion 27, adapted to fit one end of the a coils 3, and an outer perimeter of one of the coils 3, and an outer end portion 28 substantially conforming to the side end surface of the coil 3 and having portions 29 and 30, in slightly offset parallel planes, to provide a resilient clamping action. The portion 26 is provided with an elongated screw hole 32 for adjustable mounting on the screw 17 and a flange 33 having an outer-end portion, by which it is fulcrumed against the bracket 2, and sloping reinforcing side portions. This construction provides an adjustable resilient clamping means for the coil which compensates for shocks, jars and temperature changes.

In mounting the coil 3, it is placed over the projections 19 and the members 25 are placed in the positions shown in the drawings, after which the screws 17 are placed through the openings 32 and members 25 and through the brackets 2. The screws 17 may be provided with the usual nuts 35 and lock washers 36 to render the mounting permanent.

In the form of our invention illustrated in Figs. 4 and 5, in which similar parts are designated by similar reference characters, the construction is similar but is adapted to a moving-coil instrument. In this form, a moving coil 38 takes the place of the armature 6 of the above described device and there are two coils 3 mounted on the standards 2 in the same relation thereto as the single coil 3 in the device of Figs. 1 and 2. Flexible leads 39 and terminal members 40 serve to conduct current to and from the coil 38. Also, in this form, the laterally projecting members 19 project from the respective standards 2 for the reception of the coils 3 and have depressed or cut away central portions for mounting on the standards 2.

While we have shown and described particular forms of our invention, changes may be effected therein without departing from the spirit and scope thereof, as set forth in the appended claims.

We claim as our invention:

1. In an electrical measuring instrument, the combination with a supporting standard and a coil, of means for attaching the coil to the standard comprising a member having a portion for attachment to the standard, a portion crossing the end of the coil, and a portion disposed opposite an outer surface of the coil.

2. In an electrical measuring instrument, the combination with a supporting standard and a coil, of means for attaching the coil to the standard comprising a member having a portion for attachment to the standard, a portion crossing the end of the coil, and a portion disposed opposite an outer surface of the coil, said latter portion being subdivided into portions disposed in different planes to resiliently hold the coil in position.

3. In an electrical measuring instrument, the combination with a supporting standard and a coil, of means for attaching the coil to the standard comprising a member having a portion for attachment to the standard, a portion crossing the end of the coil and conforming to said end, and a portion disposed opposite an outer surface of the coil.

4. In an electrical measuring instrument, the combination with a supporting standard and a coil, of means for attaching the coil to the standard comprising a member having a portion for the attachment to the standard, a portion crossing the end of the coil, and a portion disposed opposite an outer surface of the coil, said first portion having a reinforcing flange and a fulcrum portion for engagement with the standard.

5. In an electrical measuring instrument, the combination with a supporting standard and a coil, of means for attaching the coil to the standard comprising a member having a portion for attachment to the standard, a portion crossing the end of the coil, and a portion disposed opposite an outer surface of the coil, and means for adjustably mounting said member on said standard.

6. An electrical measuring instrument comprising a base member, an elongated coil lying parallel to the base member and a pair of standards projecting from the base member to positions beside the coil adjacent to its ends and each having a lateral projection extending into the opening in the coil adjacent to the inner perimeter of one end thereof.

7. An electrical measuring instrument comprising a base member, an elongated coil lying parallel to the base member and a pair of standards projecting from the base member to positions beside the coil adjacent to its ends and each having a lateral projection extending into the opening in the coil adjacent to the inner perimeter of, and conforming to, one end thereof.

8. An electrical measuring instrument comprising an elongated coil, a pair of standards disposed adjacent to the ends of the coil and each having a receiving portion, and a member projecting laterally from each standard into the opening in the coil, each of said members having a portion adjacent to the inner end perimeter of one end of the coil and a portion mounted on one of said receiving portions.

9. An electrical measuring instrument comprising an elongated coil, a pair of standards disposed adjacent to the ends of the coil and each having a receiving portion, and a member projecting laterally from each standard into the opening in the coil, each of said members having a portion adjacent to the inner end perimeter of the coil, a portion mounted on the receiving portion of one of the standards, and a portion preventing longitudinal movement thereof relative to said standard.

10. An electrical measuring instrument comprising a base member, a shaft extending substantially normal thereto, a coil having its magnetic axis substantially normal to the shaft, a pair of standards mounted on the base member substantially normal thereto at opposite sides of the shaft and having portions engaging the same side of the coil at substantially opposite positions thereon, and a pair of members mounted on, and projecting laterally from, said standards and extending into the opening in the coil at substantially opposite points on the inner perimeter of the coil.

11. An electrical measuring instrument comprising a base member, a shaft extending substantially normal thereto, a coil having its magnetic axis substantially normal to the shaft, a pair of standards mounted on the base member substantially normal thereto at opposite sides of the shaft and having portions engaging the same side of the coil at substantially opposite positions thereon, a pair of members mounted on, and projecting laterally from, said standards and extending into the opening in the coil at substantially opposite points on the inner perimeter thereof, and a pair of members each having a portion secured to one of said standards and a portion engaging the other side of said coil.

12. An electrical measuring instrument comprising a base member, a shaft extending substantially normal thereto, a coil having its magnetic axis substantially normal to the shaft, a pair of standards mounted on the base member substantially normal thereto and having portions engaging one side of the coil adjacent to said ends and a pair of members mounted on, and projecting laterally from, said standards into the opening in said coil and having portions conforming to the inner perimeter of the coil.

13. An electrical measuring instrument comprising a base member, a shaft extending substantially normal thereto, a coil having substantially parallel sides and curved ends of uniform inner radius and disposed with its magnetic axis substantially normal to the shaft, a pair of standards mounted on the base member substantially normal thereto and having portions engaging one side of the coil adjacent to said ends, a pair of members mounted on, and projecting laterally from, said standards into the opening in said coil and having portions conforming to the inner perimeters of said ends, and a pair of members each having a portion secured to one of said standards and a portion conforming to the end surface and to a portion of the side surface of the coil.

In testimony whereof, we have hereunto subscribed our names this 28th day of September, 1923.

PAUL MacGAHAN.
RAYMOND T. PIERCE.